April 28, 1953     S. VERNET     2,636,776
PRESSURE OPERATED DEVICE
Filed July 29, 1949     2 SHEETS—SHEET 1
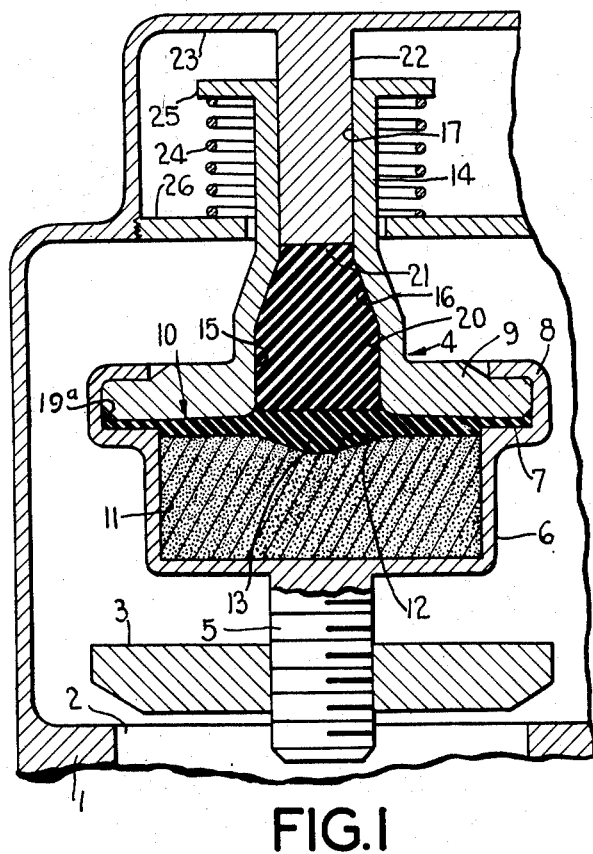
FIG. 1
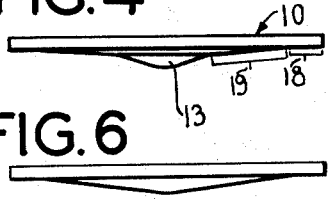
FIG. 4
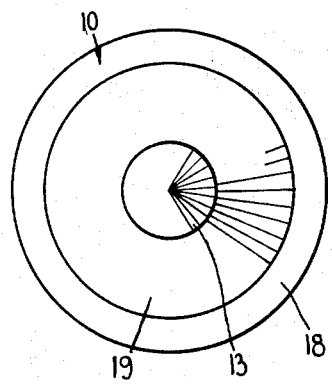
FIG. 6
FIG. 5
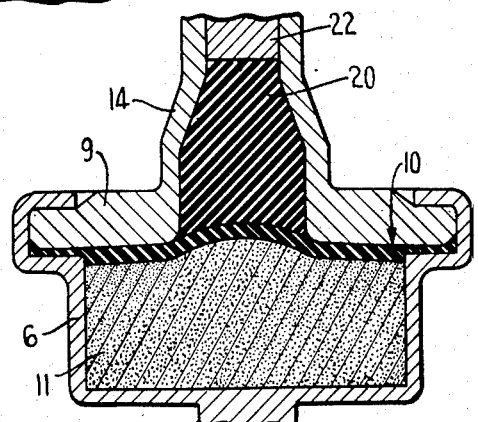
FIG. 3
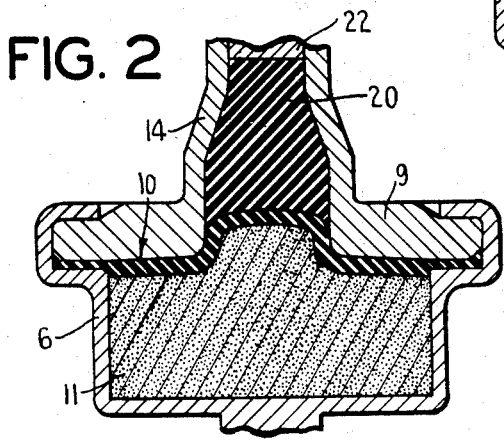
FIG. 2
INVENTOR.
Sergius Vernet
BY Andrew K. Fields
his ATTORNEY

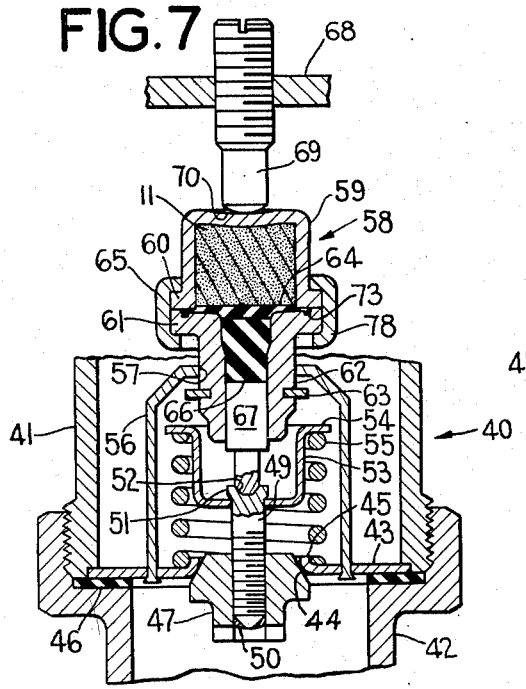
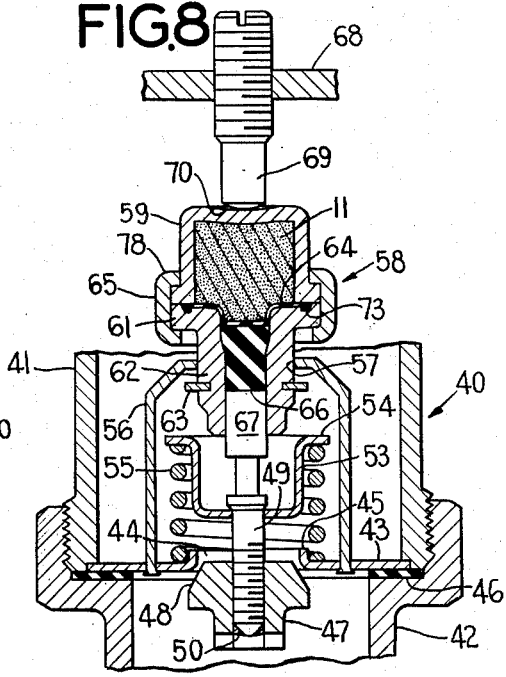
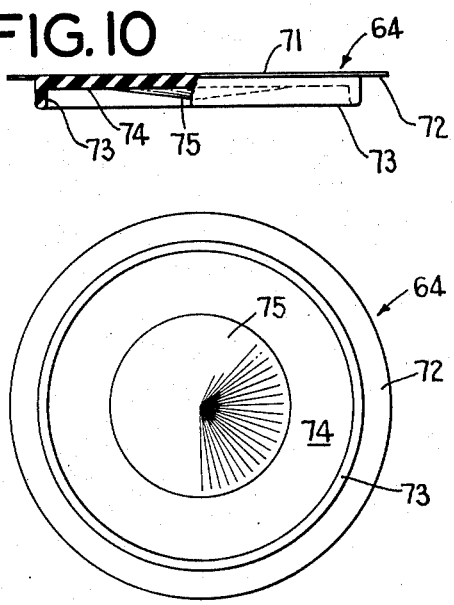
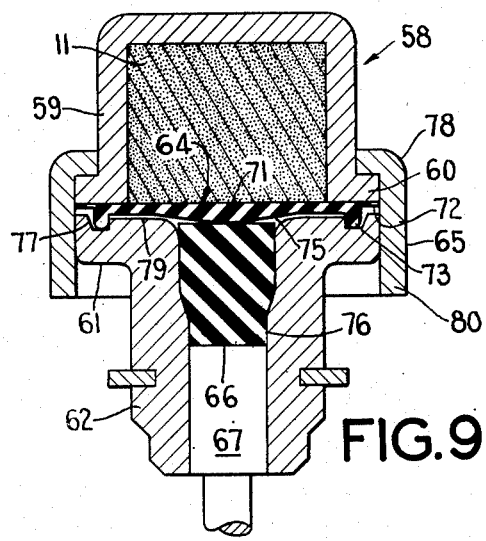

Patented Apr. 28, 1953

2,636,776

UNITED STATES PATENT OFFICE 2,636,776

PRESSURE OPERATED DEVICE

Sergius Vernet, Yellow Springs, Ohio, assignor to Antioch College, Yellow Springs, Ohio, a corporation of Ohio Application July 29, 1949, Serial No. 107,421

30 Claims. (Cl. 297—6)

This invention relates to new and useful improvements in force transmitting devices such as temperature operated power generating devices and in flexible, stretchable and resilient sealing members or diaphragms to form a part thereof.

An object of this invention is to provide a novel pressure movable diaphragm of rubber or elastomeric material which will not rupture at extremely high pressures.

Another object is to provide a thermostatic element or device having an expansible material charge and a motion transmitting and sealing diaphragm of a material capable of being formed into final contour by the actuating temperature and the pressure of the expansible material charge.

Another object is to provide a preformed rubber or elastomeric material diaphragm of such configuration that it will maintain desired characteristics during operation.

Another object is to provide a molded diaphragm blank of preaged vulcanizable material.

Another object is to provide a diaphragm of rubber or elastomeric material so shaped that when the marginal diaphragm portion is clamped between retaining surfaces, no flow or creep of the clamped portion will occur.

The invention consists in the novel power generating device, in the improved diaphragm members which are particularly adapted to the device, and in the method of forming the diaphragm members.

In the accompanying drawings to be taken as a part of this specification, there are fully and clearly illustrated several preferred embodiments of the invention, in which drawings:

Figure 1 is a view in vertical central section of a valve showing one form of thermostatic device and diaphragm member in section as assembled prior to use;

Fig. 2 is a detail view in section showing the expanded positions upon heating of the thermostatic element and diaphragm member;

Fig. 3 is a detail view in section showing the contracted position of the parts upon cooling and after aging or vulcanization of the diaphragm member;

Fig. 4 is a side edge view of the molded diaphragm member;

Fig. 5 is a bottom plan view of the diaphragm member;

Fig. 6 is a side edge view of another form of diaphragm member;

Fig. 7 is a view in longitudinal central section of another valve showing a different form of thermostatic device and diaphragm member in cold or contracted positions;

Fig. 8 is a view similar to Fig. 7, but showing the parts in hot or expanded position;

Fig. 9 is an enlarged detail view in section of the thermal power element of Fig. 7 in partially assembled position;

Fig. 10 is an enlarged detail view in side elevation with an edge portion broken away to show the structure of the diaphragm member of Fig. 7; and Fig. 11 is a bottom plan view of the diaphragm member of Fig. 10.

Referring to the drawings, Figs. 1 to 6, by characters of reference, 1 designates generally a valve body or casing having a valve port 2 controlled by a valve member 3. A temperature responsive power generating element or device 4 has a stem 5 carrying the valve member 3 and extending from the bottom wall of a cup-like rigid casing 6, preferably of brass. The side wall of the casing has an annular internal recess providing an outward facing annular shoulder 7 with a surrounding flange 8. Clamped to the shoulder 7 by a cover member 9, there is a pressure movable or responsive diaphragm member 10 of disc form to be more fully described hereinafter and which has its annular marginal portion squeezed to substantially one half its normal or formed peripheral thickness by the turning or bending over of the flange 8 upon the cover member 9. Filling the casing chamber which is closed and sealed by the diaphragm member, there is a temperature responsive material or element 11 which may be a mixture of crystalline material such as waxes, of finely divided metal such as powdered copper and a binder such as Vistanex. The material 11 has an operating range below which it is solid and in which it undergoes a change of state from a solid to a liquid, one range being, for example, from 150° to 180° F. This material 11 is placed in the cup chamber at room temperature as a preformed solid cylindrical pellet having flat substantially parallel faces or ends and a central conical depression or recess 12 formed in its diaphragm receiving or facing end so as to receive the conical or thickened central portion 13 of the diaphragm member. The cover member 9 has a central open-ended tubular extension 14 projecting outwardly and providing a sealing bore 15 opening at its inner end to the diaphragm member and opening through its outward or upward converging throat 16 into a guide bore 17. The throat 16 has its wall tapering or inclined inward and upward at about 20 degrees and of sufficient length to reduce the area of the cylindrical portion of the sealing bore to that of the guide bore in the ratio of about one and one half to one. The diaphragm member 10 is of flexible, vulcanizable, stretchable or elastic material such as elastomeric material or synthetic rubber, for example, Ameripol. Prior to placing the diaphragm member in its cup sealing position (Fig. 1), it is molded or formed with a flat top side and into the configuration shown in Figs. 4 and 5. It is then preaged so that it will hold its shape, but it is not completely vulcanized or cured, in order to permit it to be further or additionally molded or formed after being assembled in the power element. The peripheral or annular portion 18 of the preaged or partially cured or partially vulcanized diaphragm which is clamped as above described, is molded flat and seats on the shoulder 7 to which it substantially conforms in radial width. Immediately radially inward of portion 18, the diaphragm member is gradually and continuously increased in thickness as at 19, the thickness being increased radially inward inversely as the circumference is reduced so that the inward radial flare or divergence is at about 3 degrees, which conical step or annulus of increasing thickness terminates substantially on the extended line of the circumference of the sealing bore 15. The under or inner surface of the cover member 9 is tapered or converges upward from the flat clamping surface which overlies and is parallel to the shoulder 7, the taper or upward conical inclination being about equal to that of the diaphragm step 19, namely about three degrees. The marginal under edge of the cover member 9 has a chamfer or annular recess to provide a diaphragm edge receiving recess 19a into which the diaphragm is squeezed. Radially inward of the step 19, the diaphragm member increases in thickness at an angle of about 11 degrees to provide the central step or conical mid-portion 13 which registers with and is of substantially equal diameter to the sealing bore 15. However, the conical portion 13 and step 19 may increase in thickness or flare at the same angle radially inward from the flat annulus 18, the common angle being about 7 degrees so that the thickness increases at a uniform or smooth taper to the center of the diaphragm face, see Fig. 6. The diaphragm member is urged against a sealing plug 20 which may be preformed or molded to tightly fit the sealing bore 15 and throat 16 and have a cylindrical end portion 21 which tightly fits the lower or adjacent portion of the guide bore 17, see Fig. 1. The plug 20 is preferably of similar material to the diaphragm member and is held under longitudinal and lateral compression by a plunger 22 which reciprocally fits the guide bore and abuts a casing wall 23. The plunger 22 is urged against the plug 20 by a heavy helical coil compression spring 24 which engages a flange 25 on the extension 14 and which seats on a ring member 26 carried by the casing. The sealing plug 20 and cooperable parts is more fully described and claimed in my Patent 2,368,181 dated January 30, 1945.

The operation of the valve and power element 4 and the method of forming the diaphragm is as follows: When the temperature of the liquid flowing through the port 2 reaches the low limit of the operating range of the power element 4, say 150° F., the pellet 11 will begin to undergo its change of state and will by its expansion act to force the diaphragm portion 13 upward into the sealing bore 15 as shown in Fig. 2. The movement of the central portion of the pliable, elastic diaphragm member into the bore will stretch the annular diaphragm portion 19 tending to pull the edge portion 18 from its clamped position. The taper of the diaphragm portion 19 cooperates to overcome this tendency and provides an extra material thickness which can be reduced by this stretching to substantially the squeezed or clamped thickness of the edge portion 18 without breaking the joint seal between the cover member 9 and shoulder 7. This action on the portion 19 which holds the edge portion in position will also in part be brought about by the force of the pellet compressing the portion 19 against the underside of the cover member. This compression of the portion 19 tends to move some of the diaphragm material toward its marginal edge and thus acts in opposition to radially inward movement of the annular diaphragm portion 18, thus aiding in overcoming failure of the clamping seal between flanges 7 and 9. The central diaphragm portion 13 may be stretched to substantially the original molded thickness of the peripheral portion 18, but this extent of stretching, if it is permitted to be reached, will preferably not occur until substantially the upper limit of the operating or expansion range of the pellet is reached. When the pellet 11 has expanded, as shown in Fig. 2, to the upper limit of its range, the valve member 3 will have been moved to closed position. There may be some continued expansion of the pellet after the valve member is seated, but the characteristics of the pellet which has then gone through its change of state, limit its further expansion and materially reduce its expansion rate. The pressure of the pellet on the partially aged diaphragm member together with the temperature which has expanded the pellet, will further age or vulcanize the diaphragm member, tending to set or cure it in the configuration of Fig. 2. It may be desirable to age the diaphragm member before putting the power element or device to practical use, and if so, the assembled power element may be heated in a bath at an elevated temperature above the operating range, say at 250° F. and be held at such temperature for several hours. Thereafter, or after aging in use by alternate heating and cooling, the diaphragm member will be permanently formed to substantially the shape of Fig. 2, although it will still have resilience and be held somewhat stretched at the upper range of pellet expansion. When the liquid surrounding the element 4 cools below the operating range, the pellet 11 will be compressed under the force of the spring 24 and the diaphragm member will contract and be forced back into the cup member. When the diaphragm member has aged to substantially uniform thickness it will be forced back substantially into the configuration of Fig. 3.

By providing a molded diaphragm of increasing thickness toward its center, the usual thinning of the diaphragm portion which is squeezed against the plug 20 and forced into the sealing bore is eliminated and rupture of the diaphragm which would otherwise occur after repeated use is overcome. In addition, the diaphragm is not pulled away from its clamping surfaces at its clamped marginal portion which remains firmly held while the unclamped, originally thickened, portion stretches into the extension bore and provides the necessary material to follow against the plug member without reduction of the diaphragm member thickness beyond a substantially uniform thickness. The preforming of the diaphragm member to the shape of Fig. 4 or to a uniformly increasing thickness also permits it to be readily incorporated in the power element without wrinkles or overlap which would tend to cause certain and rapid failure when the thermostatic device was put to use.

Referring to the form of the invention in Figs. 7 to 11, the numeral 40 designates a valve casing or conduit comprising tubular members or sections 41, 42 screw-threaded together. The member 41 has an internal circumferential recess receiving the marginal edge of a valve port plate or partition member 43 having a central valve port 44 with its seat formed by a bent-over plate portion or flange 45. A gasket or washer 46 clamped between the ends of the sections 41, 42 and between the plate 43 and section 42, seals the joint between these parts. Cooperable with the port 44, there is a valve member or head 47 having a truncated conical face 48 engageable with the valve seat. The head 47 is screw-threaded on a valve stem 49 to which it is sealed and fixed in adjusted position by solder 50. The stem 49 has a lateral end flange or shoulder 51 and an end recess 52. A cup-like spring abutment member 53 has an end wall aperture slidably receiving the stem 49 such that the shoulder 51 seats against the wall. The member 53 has an out-turned rim or flange 54 alined with the valve port flange 45. A helical coil spring 55 seats on the partition member 43 and is located by the flange 45 which extends thereinto. The spring 55 surrounds the stem 49 and the abutment member 53 and seats against the flange 54, being held under compression and urging the valve head 47 toward port-closing position. Secured in and through apertures in the partition member 43 at the sides of the spring 55, there is a guide and supporting member 56 having a plurality of legs which extend upward above the abutment flange 54 and are joined thereabove by a cross member having a guide aperture 57 therethrough concentric with the valve port 44. Slidably supported in the aperture 57, there is a thermal power element 58 functioning generally similarly to the element 4. The element 58 has a rigid metal cup-like casing 59, preferably sheet copper, with an out-turned or laterally surrounding rim or flange 60 having a flat end face. Clamped tightly to the casing 59, there is a cover member 61 with a central aperture opening into the cylindrical bore of a tubular extension and guide member 62 projecting centrally therefrom. The extension 62 is externally cylindrical and reciprocally fits the guide aperture 57. Removal of the element 58 is prevented by an annular abutment or stop member 63 set into a circumferential recess or groove in the extension 62. The casing 59 is filled with the temperature responsive material 11 which is sealed therein by a diaphragm member 64 of a vulcanizable, pliable, elastic and stretchable material, such as rubber, synthetic rubber or elastomeric material, which has its annular marginal portion tightly clamped between the inner side of the cover member 61 and the casing end face by a clamping ring 65. The diaphragm member 64, which is of disc form and preferably of Ameripol, acts against a plunger comprising a sealing plug 66 and a piston member 67 guided in the extension bore. The plug 66 and its cooperable parts is similar to that of the plug 20. Riged with and forming part of the valve casing 40, there is a wall member or support 68 through which an adjustment screw or abutment member 69 is adjustably screw threaded. The screw 69 engages the dished end wall 70 of the casing 59, held thereagainst by the spring 55.

The diaphragm member 64 is formed, preferably by molding, to the configuration of Figs. 10 and 11, which adapts it particularly for a high degree of motion, as for use with a pellet or material having a large expansion. This diaphragm has a flat side or surface 71 which terminates in a marginal portion or surrounding flange extension 72 which extends outward in the plane of the side 71 beyond a continuous circular bead or ring 73. The marginal portion 72 being very thin and of substantially "paper thin" thickness, might be likened to a "flash" edge portion of a casting. The ring 73 has parallel sides normal to the face 71 which merge into a surface of semi-circular cross-section, see Fig. 10. Within the ring 73, the diaphragm member has an annular flat portion 74 with a surface parallel to the face 71 and which surrounds a central generally conical portion 75 which may have less thickness than the ring 73. In order to more clearly point out one operative proportioning of the diaphragm member which is to have a high degree of motion, the following is an example (in inches). With an outside diameter of say 0.590, the flash portion would be 0.032 wide by 0.005 thick, the ring 0.032 thick and 0.050 high from the face 71, the annular portion 0.090 by 0.020, and the central portion of 0.141 radius with a maximum thickness of 0.037 taken from the face 71, the central portion having a spherical apex or crown of 0.125 radius. In instances where the diaphragm member is to be used more as a seal than as a motion transmitting member, that is, is to have relatively little expansion, the thickness of the conical portion may be reduced at forming and may, in some cases, be eliminated. The flash edge portion 72 is highly important as it fills up any and all spaces between and at its casing clamping surfaces and, together with the extremely small cross-section between the casing clamping faces, eliminates radial outward flow of the diaphragm portion which is inward of the flash edge portion 72, so that no change will occur in the calibration of the element 58 in use.

The thermal element 58 is assembled, see Fig. 9, as follows: The temperature responsive material 11 which is formed under high pressure into a pellet which fits the casing 59, is placed therein. The cylindrical plug 66 is forced into the bore 76 and the diaphragm member 64 is placed thereover with the ring 73 extending into an annular groove 77 in cover member 61 in concentric relation to the bore 76. The retaining or clamping ring 78 is fitted over the casing 59 with its lateral inward flange seating against the outward rim flange on the casing. The annular cover member portion 79 is recessed relative to the marginal or peripheral portion which is outward of the groove 77. The cover member 61 with its plug and diaphragm member are then inserted into the ring 78 as in Fig. 9 and the piston 67 is put in place abutting the plug 66. The complete assembly is then mounted in a clamping jig or fixture (not shown) which while holding the piston against the plug, as shown, forces the cover member 61 into tightly squeezing engagement with the substantially paper thin flash flange 72. With the parts so held, the end portion 80 of the ring 78 is rolled or swaged over onto the outer annular face of the cover member 61 as shown in Figs. 7 and 8. The flash flange 72 fills up any cavities which may remain between the cover member and the end wall 60 of the casing 59. It should be noted that the ring or bead 73 flows into the groove 77 completely filling it and together with the flash flange 72 seals the joint between the casing and its cover. The clamping reduces the outer part of the annular diaphragm portion to half its original thickness, i. e. to 0.010 inch. This bead and flange cooperate to eliminate any movement of the diaphragm peripheral portion out of clamped position, that is, there is no creeping of the edge portion upon expansion and contraction of the diaphragm member. The annular portion of the diaphragm member 64 which overlies the recessed cover portion 79 inward of the casing functions upon pellet and diaphragm member expansion in the same manner as the corresponding diaphragm member portion in Fig. 1. It should also be noted that the clamping or locking of the diaphragm edge portion in the recess 19ᵃ of Fig. 1 functions in the same manner as the bead 73 and recess 77 of Fig. 7 to prevent pulling of the diaphragm inwardly out of its clamped position between the casing and cover. The depression 70 is created by an inbending of the wall resulting from calibration of the piston zero position.

It is believed that the operation will be apparent from the foregoing description. However, upon a predetermined temperature, say, 150° F. which may be termed the zero plunger or piston position, the pellet 11 will start to undergo its change of state and at the upper limit of the temperature range, say 170° F., the pellet will have increased in volume as shown in Fig. 8, thereby forcing the diaphragm member in a "hat-like" form with the central portion reduced in thickness substantially to that of the annular clamped portion. As in the diaphragm form of Figs. 1 to 6, the thickened diaphragm central portion 75 provides the additional material for the crown of the "hat-like" diaphragm form thereby eliminating the usual diaphragm thinness at the center part which causes rupture. As the pellet increases in volume, it exerts sufficient force to overcome the spring 55 and moves the valve member 47 toward the open position of Fig. 8. Conversely, as the temperature affecting the pellet falls below, say 170° F., the spring 55 will urge the piston 67 inward, compressing the pellet as it reduces in volume and moving the valve member toward its seat.

This application is a continuation in part of my co-pending application, Serial No. 543,566, filed July 5, 1944, for Pressure Operated Devices, now abandoned.

Having thus described the invention, what is claimed and desired to be secured by Letters Patent of the United States is:

1. A diaphragm comprising a disc of pliable elastic material having one side flat and terminating in a surrounding flange extension of said one side, said disc having a continuous circular bead surrounding the disc body portion and projecting from its other side, said bead being positioned inward of and spaced from the disc periphery by said flange, said flange being of less thickness than the thinnest part of said body portion.

2. A diaphragm comprising a disc of pliable elastic material having one side flat and terminating in a surrounding flange extension of said one side, said disc having a continuous circular bead surrounding the disc body portion and projecting from its other side, said bead being positioned inward of and spaced from the disc periphery by said flange, said disc having the mid-portion of its said other side of generally conical form, said flange being of less thickness than the thinnest part of said body portion.

3. A diaphragm comprising a disc of pliable elastic material having one side flat and terminating in a surrounding flange extension of said one side, said disc having a continuous circular bead surrounding the disc body portion and projecting from its other side, said bead being positioned inward of and spaced from the disc periphery by said flange, said disc having the mid-portion of its said other side of generally conical form, and said other side having an annular flat surface portion parallel to said one side and surrounding said mid-portion and terminating at said bead, said flange being of less thickness than the thinnest part of said body portion.

4. A diaphragm comprising a disc of pliable elastic material having one side flat and terminating in a surrounding flash-like flange extension of said one side, said disc having a continuous circular bead surrounding the disc body portion and projecting from its other side, said bead being positioned inward of and spaced from the disc periphery by said flange, said disc having the mid-portion of its said other side of generally conical form, and said other side having an annular flat surface portion parallel to said one side and surrounding said mid-portion and terminating at said bead which is of greater thickness than said flat surface portion, said flange being of less thickness than the thinnest part of said body portion.

5. A molded diaphragm blank comprising a disc of pliable stretchable and elastic material having a central generally conical portion and a surrounding annular portion with flat parallel faces, the base of said conical portion lying in the same plane as one face of the said annular portion of said disc, the other face of said disc being flat to its periphery.

6. A molded diaphragm blank comprising a disc of pliable stretchable material having a central generally conical portion and a surrounding annular portion with parallel faces, the base of said conical portion lying in the same plane as one face of said annular portion, and a flash-like flange extending outward from said one face.

7. A molded diaphragm blank comprising a disc of vulcanizable and stretchable material having concentric areas increasing gradually in thickness toward the disc center in stepped tapers of increasing angle from a circular line inward of its periphery.

8. A molded diaphragm blank comprising a disc of vulcanizable and stretchable material having a plurality of concentric areas, each area increasing gradually and uniformly in thickness toward the disc center, one of said areas having its thickness increasing at a greater rate than the next adjacent outer area.

9. The method of shaping a diaphragm to final form and thickness which comprises clamping in sealing relation between a cup containing an expansible material and a cover member which has a central tubular extension and an annular cover portion overlying the expansible material of a molded partially vulcanized diaphragm having a thickened central portion alined with said extension, subjecting said cup to temperature sufficiently high to expand said material and to continue vulcanization of said diaphragm, resisting movement of said diaphragm central portion into said extension under the expansive force of said expansible material, and limiting the stretching of said central portion to provide a substantially uniform diaphragm thickness.

10. The method of shaping a diaphragm to final form and thickness which comprises clamping in sealing relation between a cup containing an expansible material and a cover member which has a central tubular extension and an annular cover portion overlying the expansible material of a molded partially vulcanized diaphragm having a thickened central portion alined with said extension, subjecting said cup to temperature sufficiently high to expand said material and to continue vulcanization of said diaphragm, resisting movement of said diaphragm central portion into said extension under the expansive force of said expansible material, and alternately heating and cooling said cup to gradually age said diaphragm, limiting the stretching of said central portion to provide a substantially uniform diaphragm thickness.

11. The method of shaping a diaphragm to final form and thickness which comprises clamping in sealing relation between a cup containing an expansible material and a cover member which has a central tubular extension and an annular cover portion overlying the expansible material of a molded partially vulcanized diaphragm having a thickened central portion alined with said extension, subjecting said cup to temperature sufficiently high to expand said material and to continue vulcanization of said diaphragm, resisting movement of said diaphragm central portion into said extension under the expansive force of said expansible material, and maintaining said temperature until said diaphragm molds to uniform thickness, limiting the stretching of said central portion to provide a substantially uniform diaphragm thickness.

12. In a control device, a casing having an opening with a marginal clamping surface, a cover member overlying said opening and having an annular portion inward of said surface and a central open-ended hollow extension, a diaphragm overlying said hollow extension and having its marginal portion clamped to said surface by said cover member, said diaphragm increasing in thickness toward its mid-portion, means resisting movement of said diaphragm into said extension, means determining the final extent of movement of said diaphragm into said extension, the increased thickness of said diaphragm being predetermined such that said diaphragm will be stretched to substantially uniform thickness inward of said clamping surface at said final extent of movement, means squeezing said cover member against said marginal diaphragm portion with a force such that said marginal portion will be firmly held at said final extent of movement, said diaphragm lying against said cover member annular portion, and means continually holding said diaphragm against said annular portion.

13. A temperature responsive power generating element comprising a cylindrical cup-like casing having an open end with an outward facing shoulder, a cover member having a central open-ended hollow extension projecting therefrom, said cover member having its periphery overlying said shoulder and having an annular portion inward thereof, a preformed diaphragm of vulcanizable material lying against said cover member annular portion within said casing and having its peripheral portion squeezed against said shoulder by said cover member, said diaphragm being initially formed with increasing thickness toward its mid-portion and having its greatest thickness alined with the bore of said extension, and expansible temperature responsive material solid below its operating range and filling the space in said casing beneath said diaphragm, said expansible material continually holding said diaphragm against said annular portion.

14. A temperature responsive power generating element comprising a cylindrical cup-like casing having an open end with an internal outward facing shoulder, a cover member having a central open-ended hollow extension projecting therefrom, said cover member having its periphery overlying said shoulder and having an annular portion inward of said shoulder, a preformed diaphragm of vulcanizable material lying against said annular portion and said cover member within said casing and having its peripheral portion squeezed against said shoulder by said cover member, said diaphragm being initially formed with increasing thickness toward its mid-portion and having a conical inward directed portion alined with the bore of said extension, and expansible temperature responsive material solid below its operating range and filling the space in said casing beneath said diaphragm, said expansible material continually holding said diaphragm against said annular portion.

15. In a temperature responsive power generating element, a cup-like casing having an open top, a molded diaphragm of vulcanizable material closing said open top and having a collapsed and an expanded position, a cover member having a hollow open-ended central extension and clamping said diaphragm against said casing, said diaphragm being preformed of increasing thickness toward its central portion, temperature responsive expansible crystalline material filling said casing and having an operating range, said diaphragm having its central portion stretched to substantially uniform thickness and forced into said hollow extension to its expanded position by expansion of said material and being aged to final form in said expanded condition by the temperature which expands said responsive material through its operating range.

16. In a control device, a rigid cup-like casing having an end wall, a cover member having a central bore of less diameter than the internal diameter of said casing, said cover member having an annular recess overlying said end wall and spaced inward from its peripheral portion and having an annular central portion recessed below its peripheral portion, a thermostatic pellet filling said casing, a diaphragm member of pliable elastic material having an annular bead filling said recess and having a flash flange extending around said bead and lying against said casing end wall, means clamping said flash flange between said end wall and said cover member peripheral portion, and a plug member fitting the bore of said cover member and engaging said diaphragm.

17. A diaphragm member of vulcanizable material comprising a body member having an annular clamping portion and an annular clamping flange surrounding and extending from said portion, said portion having opposed clamping surfaces, and said flange being of less thickness than said portion.

18. A diaphragm member of vulcanizable material comprising a body member having an annular clamping portion and an annular clamping flange surrounding and extending from said portion, said portion having opposed clamping surfaces, and said flange being of substantially paper-thin thickness.

19. A diaphragm member of vulcanizable material comprising a body member having in a common plane an annular clamping portion and an annular clamping flange extending from and surrounding said portion, said portion having opposed flat clamping surfaces, and said flange being of less thickness than said portion.

20. A diaphragm member comprising a disc of vulcanizable material having an expansible body portion, an annular clamping portion surrounding said body portion and an annular clamping flange surrounding said clamping portion, said clamping portion having opposed clamping surfaces, and said flange being of substantially paper-thin thickness and having its clamping surfaces extending radially outward from said clamping portion.

21. In a control device, annular clamping members having opposed annular clamping surfaces, one of said surfaces having an annular recessed portion radially inward of its marginal edge, a diaphragm member of vulcanizable material extending across said clamping members and having an annular clamping portion engaged by said recessed portion and having an annular clamping flange surrounding said clamping portion and engaged between and by said surfaces, said flange having less thickness than said clamping portion.

22. In a control device, annular clamping members having opposed annular clamping surfaces, one of said surfaces having an annular recessed portion radially inward of its marginal edge, a diaphragm member of vulcanizable material extending across said clamping members and having an annular clamping portion engaged by said recessed portion and having an annular substantially paper-thin clamping flange surrounding said clamping portion and extending between said surfaces, and means tightly clamping said surfaces together.

23. A diaphragm member having initial and final forms and being of vulcanizable material, said member in said initial form being flat on one side to its periphery and having on its other side a thickened central portion of gradually increasing thickness toward its center, said final form having a cup-like central portion extending oppositely from said thickened portion and with a lateral rim portion, said thickened central portion having been reduced to substantially uniform thickness to form said cup-like central portion.

24. The method of making a diaphragm member of substantially uniform thickness which comprises forming a circular blank of vulcanizable material having a thickened central portion, and stretching the thickened central portion to substantially uniform thickness.

25. The method of making a diaphragm member of substantially uniform thickness which comprises forming a circular blank of vulcanizable material having a thickened central portion, stretching the thickened central portion to substantially uniform thickness and then aging the material while so stretched.

26. The method of making a diaphragm member of substantially uniform thickness which comprises forming a circular blank of vulcanizable material having a thickened central portion holding the peripheral portion of said blank against movement, and forcing the thickened portion into a recess until it is stretched to substantially uniform thickness.

27. A diaphragm member having initial and final forms and being of vulcanizable material, said member in said initial form having an annular portion and a central thickened portion of gradually increasing thickness toward its center, said member in said final form having a cup-like central portion surrounded by said annular portion, said central thickened portion having been reduced in thickness to form said cup-like central portion.

28. The method of making a diaphragm member having a central cup-like portion which comprises forming a circular blank of vulcanizable material having a thickened central portion, stretching and molding said thickened portion into substantially cylindrical cup-like form, and subjecting said material while stretched to vulcanizing temperature.

29. A molded diaphragm blank of vulcanizable material in partially vulcanizable state comprising an imperforate disc having a thickened central portion with a predetermined increasing thickness substantially to its center and having an annular portion with opposite flat faces surrounding said central portion, one of said faces being flat to the periphery of said disc, said predetermined increase in thickness providing excess material to form a central cup-like portion.

30. In a control device, a casing member, a cover member, one of said members having a hollow extension, temperature responsive expansible material solid below its operating range and contained within said casing, said material in its operating range having a portion expanded into said extension, a diaphragm member of vulcanizable material having initial and final forms and having its marginal portion clamped between said members, and in initial form having a thickened central portion of increasing thickness toward its center positioned between said extension and said material, a plug member fitting said extension and seating on said diaphragm member, said diaphragm member in said final form having a cup-like central portion molded from said thickened central portion by compression of said expanded material portion against said plug member.

SERGIUS VERNET.

References Cited in the file of this patent

UNITED STATES PATENTS

| Number | Name | Date |
|---|---|---|
| 1,479,733 | Quinn | Jan. 1, 1924 |
| 1,924,888 | Tatter | Aug. 29, 1933 |
| 2,115,502 | Vernet | Apr. 26, 1938 |
| 2,188,342 | England | Jan. 30, 1940 |
| 2,201,661 | Cohn | May 21, 1940 |
| 2,272,304 | Lohman | Feb. 10, 1942 |
| 2,307,066 | Paulus | Jan. 5, 1943 |
| 2,312,332 | Gramelspacker | Mar. 2, 1943 |
| 2,324,880 | Rogers | July 20, 1943 |
| 2,363,508 | Doster | Nov. 28, 1944 |

FOREIGN PATENTS

| Number | Country | Date |
|---|---|---|
| 531,280 | Great Britain | Jan. 1, 1941 |